(12) United States Patent
Lung et al.

(10) Patent No.: US 7,617,754 B2
(45) Date of Patent: Nov. 17, 2009

(54) SAWING MACHINE HAVING AN ANGLE INDICATOR

(75) Inventors: Yu-Chuan Lung, Taichung Hsien (TW); Cheng-Hung Chiu, Taichung Hsien (TW)

(73) Assignee: Rexon Industrial Corporation Ltd., Taichung Hsien (TW)

( * ) Notice: Subject to any disclaimer, the term of this patent is extended or adjusted under 35 U.S.C. 154(b) by 250 days.

(21) Appl. No.: 11/703,223

(22) Filed: Feb. 7, 2007

(65) Prior Publication Data
US 2007/0180966 A1    Aug. 9, 2007

(30) Foreign Application Priority Data
Feb. 8, 2006   (TW) .............................. 95104240 A

(51) Int. Cl.
*B23D 45/06* (2006.01)
(52) U.S. Cl. ................. 83/473; 83/477.2; 83/522.18
(58) Field of Classification Search ............ 83/477.2, 83/522.17–522.21, 473
See application file for complete search history.

(56) References Cited

U.S. PATENT DOCUMENTS

| 2,008,673 | A | * | 7/1935 | Ocenasek | .................... 83/473 |
| 5,752,892 | A | * | 5/1998 | Taomo et al. | ............... 474/112 |
| 7,066,069 | B2 | | 6/2006 | Ku et al. | |

* cited by examiner

*Primary Examiner*—Kenneth E. Peterson
(74) *Attorney, Agent, or Firm*—Browdy and Neimark, PLLC

(57) ABSTRACT

A sawing machine having an angle indicator has a worktable, a pivot shaft, a saw blade holder fastened to the pivot shaft as the pivoting center thereof and having a motor, and a saw blade connected to the saw blade holder, rotatable by the motor and passing through the worktable. The angle indicator has an angle indicating member having an index zone and a following member. The following member is fixed on the pivot shaft and connected to the angle indicating member. Thereby the saw blade is moved with the saw blade holder, and the following member is pivoted with the saw blade holder by the pivot shaft to result in movement of the index zone when the saw blade holder pivots, so that the displacement of the index zone corresponds to the movement of the saw blade.

9 Claims, 6 Drawing Sheets

SAWING MACHINE HAVING AN ANGLE INDICATOR

BACKGROUND OF THE INVENTION

1. Field of the Invention

The present invention relates generally to a sawing machine and more particularly, to a sawing machine having an angle indicator for showing the cutting angle of a saw blade of the sawing machine.

2. Description of the Related Art

As shown in FIG. 7, a conventional table saw 90 for woodworking includes a worktable 92, a base 94 supporting the worktable 92, a saw blade holder (not shown) pivotally mounted inside the base 94, and a saw blade 96 rotatably mounted to the saw blade holder. The saw blade 96 is extendable through a slot of the worktable 92 and tiltable relative to the worktable 92 upon rotation of the saw blade holder such that the worker can adjust the angle of the saw blade 96 relative to the worktable 92 to perform various cutting operations in different cutting angles subject to different requirements.

Further, the front wall of the base 94 is provided with an arched slot 942 and graduations 944 along one side of the arched slot 942. A pointer 98 is extended from the saw blade holder, which is movable with the saw blade holder in the arched slot 942. When the saw blade holder is pivoted to result in the tilt of the saw blade 96 relative to the worktable 92, the pointer 98 is moved correspondingly along the arched slot 942, thereby indicating the tilting angle of the saw blade 96. Therefore, when adjusting the position of the saw blade 96, the worker can know the present tilting angle of the saw blade 96 through a graduation 944 indicated by pointer 98.

However, because the graduations 944 is marked along one side of the arched slot 942 on the front wall of the base 94 below the worktable 92, the line of sight of a user for checking the tilting angle of the saw blade 96 will be blocked by the worktable 92 when the user stands, resulting in that the user can not read the tilting angle of the saw blade 96. Therefore, the user has to stoop or squat for the adjustment without convenience.

SUMMARY OF THE INVENTION

The present invention has been accomplished under the circumstances in view. It is one objective of the present invention to provide a sawing machine having an angle indicator, which enables the user to conveniently realize the cutting angle of the sawing machine.

The sawing machine has a worktable, a pivot shaft, a saw blade holder fastened to the pivot shaft as the pivoting center thereof, pivoted relatively to the worktable so as to synchronously rotate the pivot shaft and having a motor, and a saw blade connected to the saw blade holder, rotatable by the motor and passing through the worktable. To achieve this objective of the present invention, the sawing machine has an angle indicating member and a following member. The angle indicating member has an index zone. The following member is fixed on the pivot shaft and connected to the angle indicating member. Thereby the saw blade is moved with the saw blade holder, and the following member is pivoted with the saw blade holder by the pivot shaft to result in movement of the index zone of the angle indicating member when the saw blade holder pivots, so that the displacement of the index zone of the angle indicating member corresponds to the movement of the saw blade.

In an embodiment of the present invention, the worktable of the sawing machine provide a through hole corresponding in location to the index zone of the angle indicating member such that the index zone is visually accessible through the through hole of the worktable above the worktable. Therefore, the worker can stand seeing the reading of the cutting angle of the saw blade 14 conveniently, not stoop or squat.

BRIEF DESCRIPTION OF THE DRAWING

The present invention will be fully understood from the detailed description given hereinbelow and the accompanying drawings which are given by way of illustration only and thus are not limitative of the present invention and wherein.

DETAILED DESCRIPTION OF THE INVENTION

Figure 1:
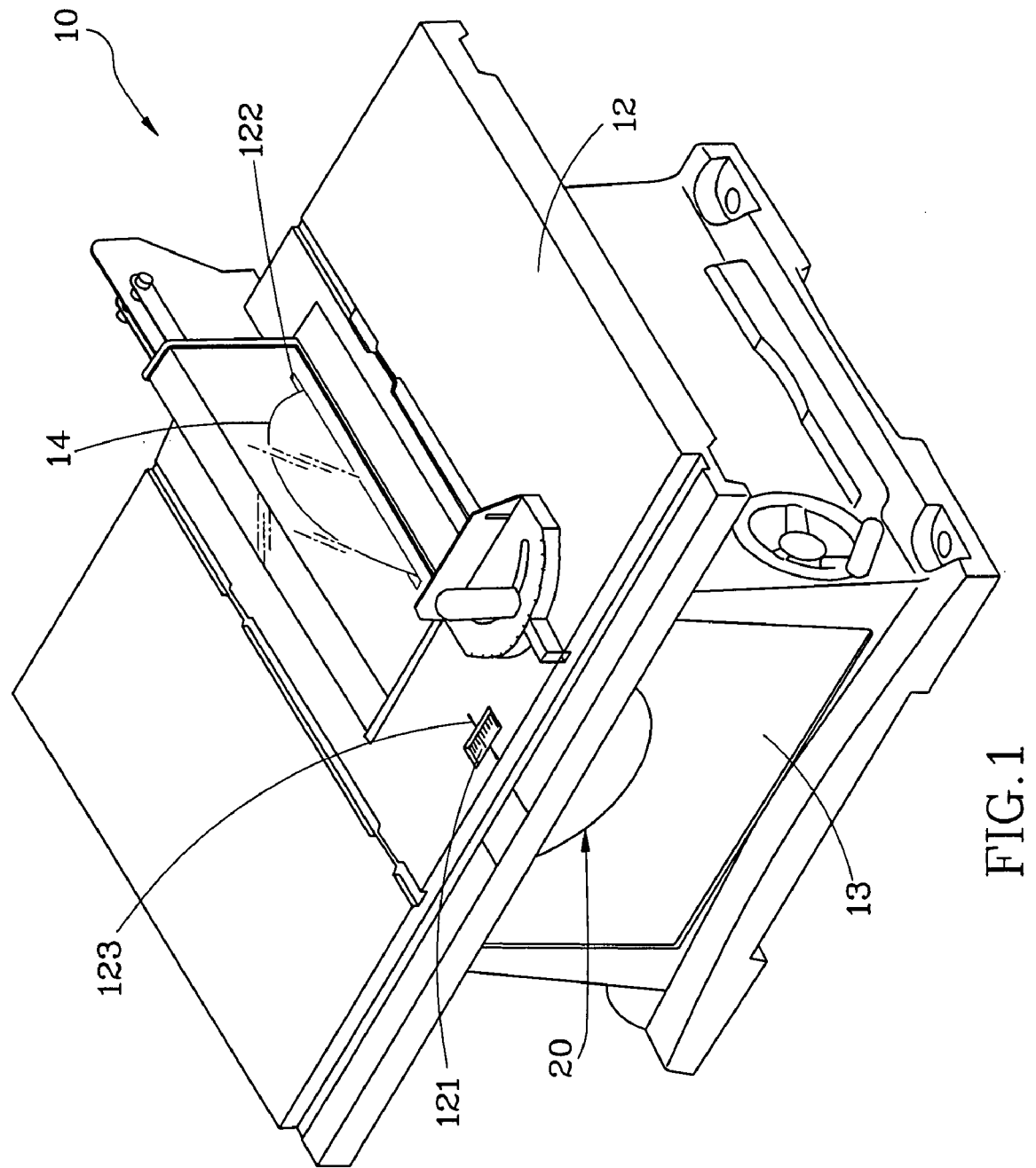
FIG. 1 is a perspective view showing a sawing machine in a first embodiment of the present invention.
Figure 2:
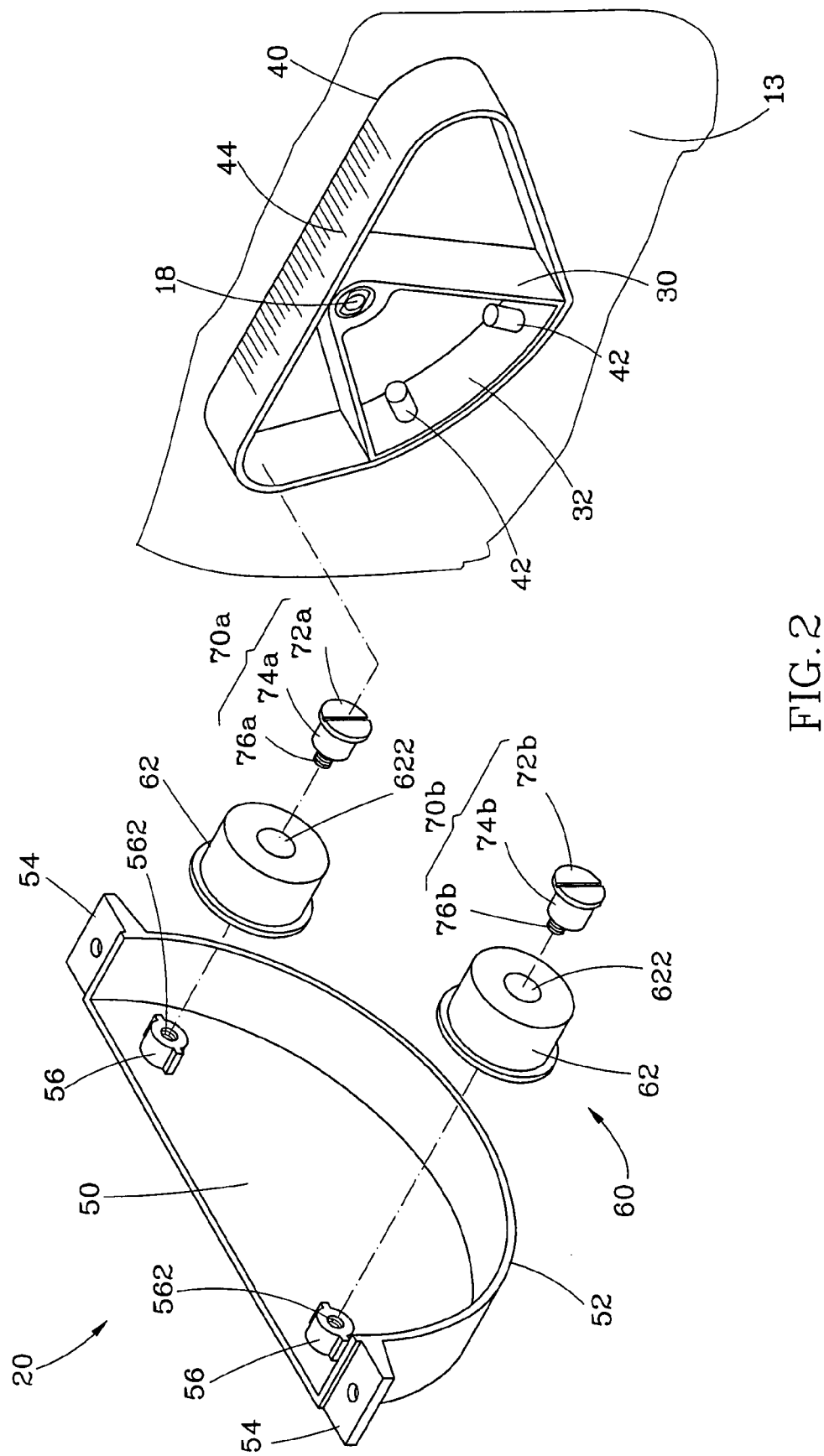
FIG. 2 is an exploded view of an angle indicator in the first embodiment of the present invention.
Figure 5:
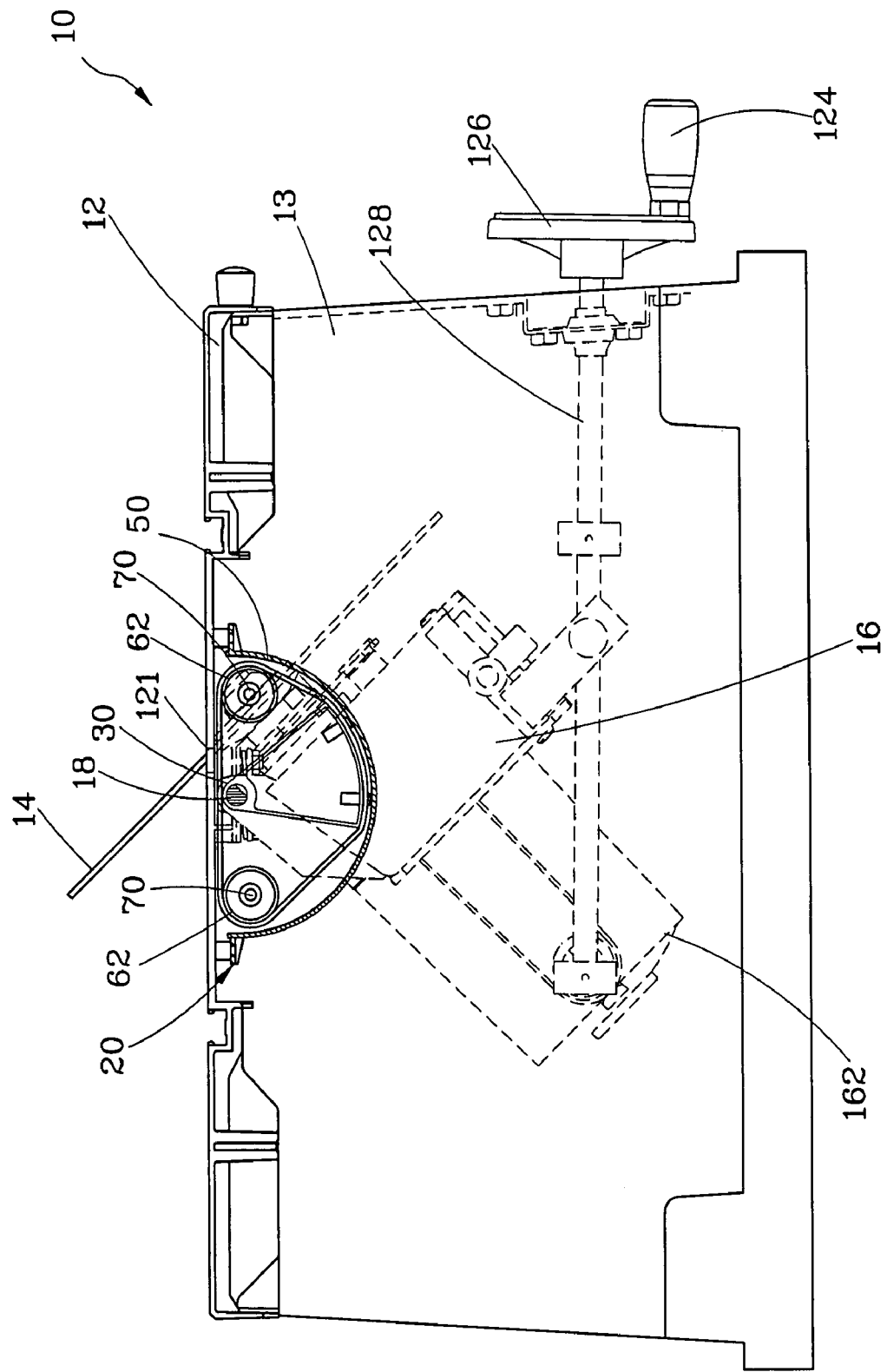
FIG. 5 is a schematic drawing showing an operation status of the sawing machine in the first embodiment of the present invention.

As shown in FIGS. 1, 2 and 5, a sawing machine 10 provides an angle indicator 20 in a first embodiment of the present invention for indicating the titling angle, i.e. the cutting angle, of a saw blade 14. The sawing machine 10, which is embodied as a table saw for illustrative purpose in this embodiment, has a worktable 12, a base 13 supporting the worktable 12, a saw blade holder 16 and a pivot shaft 18, except the aforesaid angle indicator 20 and saw blade 14.

The worktable 12 provides the top surface for bearing a workpiece, a through hole 121, an elongate cutting slot 122, and a pointer 123 marked on the top surface and adjacent to the through hole 121.

The saw blade holder 16 has a motor 162. The saw blade 14 is connected to the motor 162, rotatable by the motor 162, and passes through the elongate cutting slot 122 of the worktable 12 for cutting the workpiece. The saw blade holder 16 is fastened to the pivot shaft 18 as its pivoting center such that, with the saw blade holder 16, the pivot shaft 18 is synchronously rotated and the saw blade 14 is synchronously tilted relative to the worktable 12 when the saw blade holder 16 is pivoted relative to the worktable 12. The pivot shaft 18 is rotatably connected to the worktable 12 and extends out of the base 13.

The angle indicator 20 has a following member 30, an angle indicating member, and a cover 50. The following member 30 is a sector-like member having an arched face 32. The following member 30 is fixed with its top end to the pivot shaft 18. When the saw blade holder 16 pivots, the pivot shaft 18 is rotated to make the following member 30 synchronously pivoted relative to the worktable 12 with the pivot shaft 18 as its pivot center.

The angle indicating member has an elastic belt 40 affixed to the arched face 32 of the following member 30 by two bolts 42 in this embodiment. The angle indicating member further has an index zone 44 providing a plurality of graduations, marked on elastic belt 40 and corresponding in location to the through hole 121 of the worktable 12 such that the graduations of the index zone 44 of the angle indicating member can be visually accessible through the through hole 121.

The cover 50 is a semicircular cover shell having an arched face 52 and two lugs 54 apart at each of the two distal ends of the arched face 52. The two lugs 54 are affixed to the bottom surface of the worktable 12 with screws. After installation of the cover 50 to the bottom surface of the worktable 12, the cover 50 covers the angle indicating member. The radius of the arched face 52 of the cover 50 corresponds to the pivoting radius of the following member 30; therefore, the following member 30 can pivot inside the cover 50 along the arched face 52 of the cover 50. The cover 50 provides two locating portions 56 at one side thereof that faces the base 13, each of which has a threaded mounting hole 562.

The angle indicating member further has a guiding member 60 in this embodiment providing two rollers 62 and two locating members 70a and 70b. The two rollers 62 are respectively disposed at the locating portions 56 and located apart beyond each of two opposite sides of the pivot shaft 18. The center of each roller 62 is a center through hole 622 aligned with the threaded mounting hole 562 of the locating portions 56. The elastic belt 40 runs over the rollers 62 and is tensed by the rollers 62 to provide a plane facing and paralleling said worktable.

Figure 3:
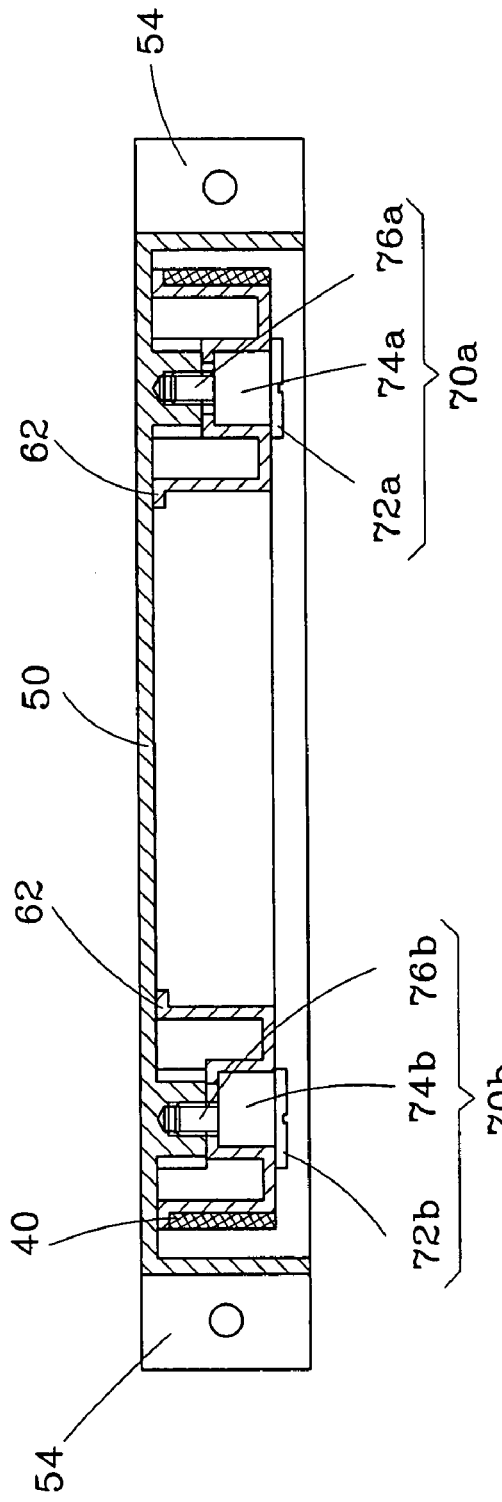
FIG. 3 is a sectional view showing the combination of guiding members and a cover in the first embodiment of the present invention.
Figure 4:
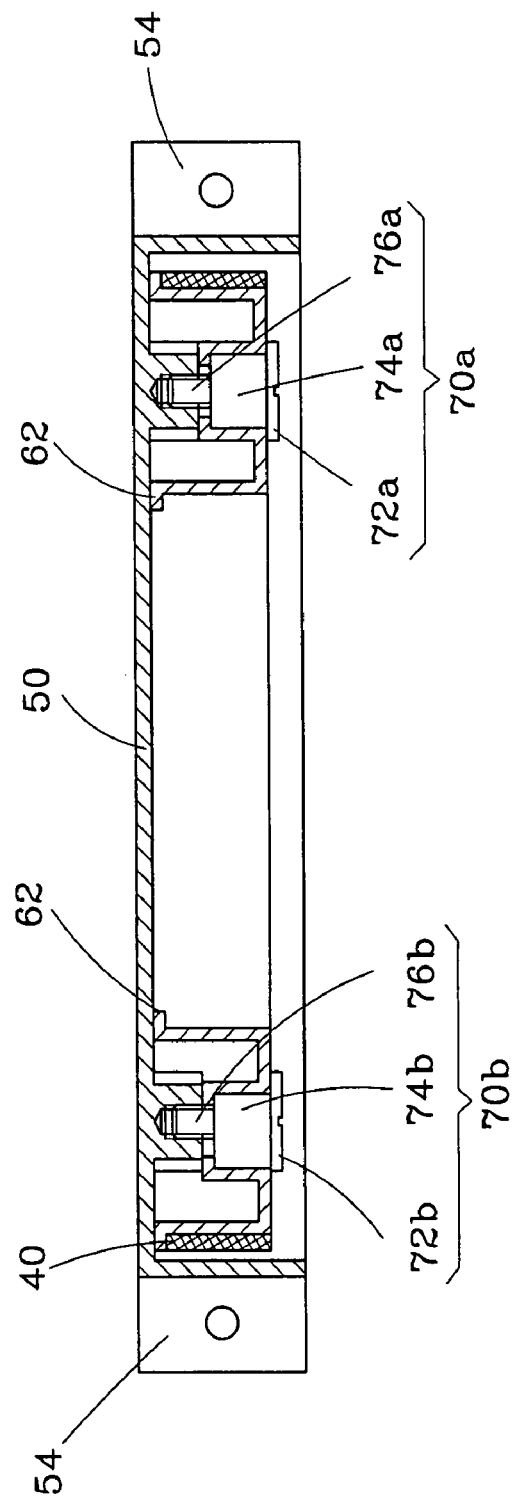
FIG. 4 is similar to FIG. 3 but showing that the guiding members are moved.

Referring to FIGS. 3 and 4, the locating members 70a,70b each have a head 72a/72b, a body portion 74a/74b extending from the head 72a/72b, and an rear-end portion 76a/76b with a thread extending from the body portion 74a/74b opposite to the head 72a/72b. The dimension of the head 72a/72b is greater than the dimension of the center through hole 622 of the roller 62. The body portions 74a,74b of the locating members 70a,70b respectively insert into the center through holes 622 of the rollers 62 to makes the rollers 62 slipped thereon, and the rear-end portions 76a,76b are respectively screwed into the threaded mounting holes 562 of the locating portions 56. Thus, the rollers 62 are rotatable about the body portions 74a,74b of the locating members 70a,70b, and the heads 72a,72b stop the rollers 62 from escaping from the body portions 74a,74b. Further, at least one of the rear-end portions 76a,76b of the locating members 70a,70b, for example, the rear-end portion 76b of the locating member 70b, connects with the eccentric part of the body portion 74b. Therefore, when the locating member 70b is rotated, the distance between the two body portions 74a,74b is increased, such that the rollers 62 is forced to tense the elastic belt 40.

In the second embodiment, the aforesaid graduations can be marked on the top surface of the worktable 12 near the through hole 121 and the aforesaid pointer 123 can be marked on the index zone 44 of the elastic belt 40. Thereby, the tilting angle of the saw blade can also be read by the graduation pointed out by the pointer 123.

Referring to FIG. 5, the pivoting structure of the saw blade holder 16 is similar to the conventional one. In first embodiment, the pivoting structure of the saw blade holder 16 is embodied comprising a threaded rod 128, a wheel 126, and a handle 124 for illustrative purpose. When wanting to adjust the position of the saw blade holder 16, the user holds the handle 124 to rotate the wheel 126 to make the threaded rod 128 rotate, thereby moving the saw blade holder 16. When the saw blade holder 16 is pivoted, the included angle between a lateral side of the saw blade 14 and the worktable 12 is accordingly changed, and the following member 30 is synchronously pivoted by the pivot shaft 18 relative to the worktable 12, so that the elastic belt 40, which runs over the rollers 62, is moved relative to the worktable 12. Therefore, the displacement of the index zone 44 marked on the elastic belt 40 corresponds to the titling angle of the saw blade 14. Accordingly, the user can know the current cutting angle of the saw blade 14 relative to the worktable 12 by reading the graduation in the index zone 44 that is pointed out by the pointer 123 through the through hole 121. Further, because the graduations of the index zone 44 are visually accessible through the through hole 121 above the worktable 12, the worker can stand seeing the reading of the cutting angle of the saw blade 14 conveniently, not stoop or squat.

Figure 6:
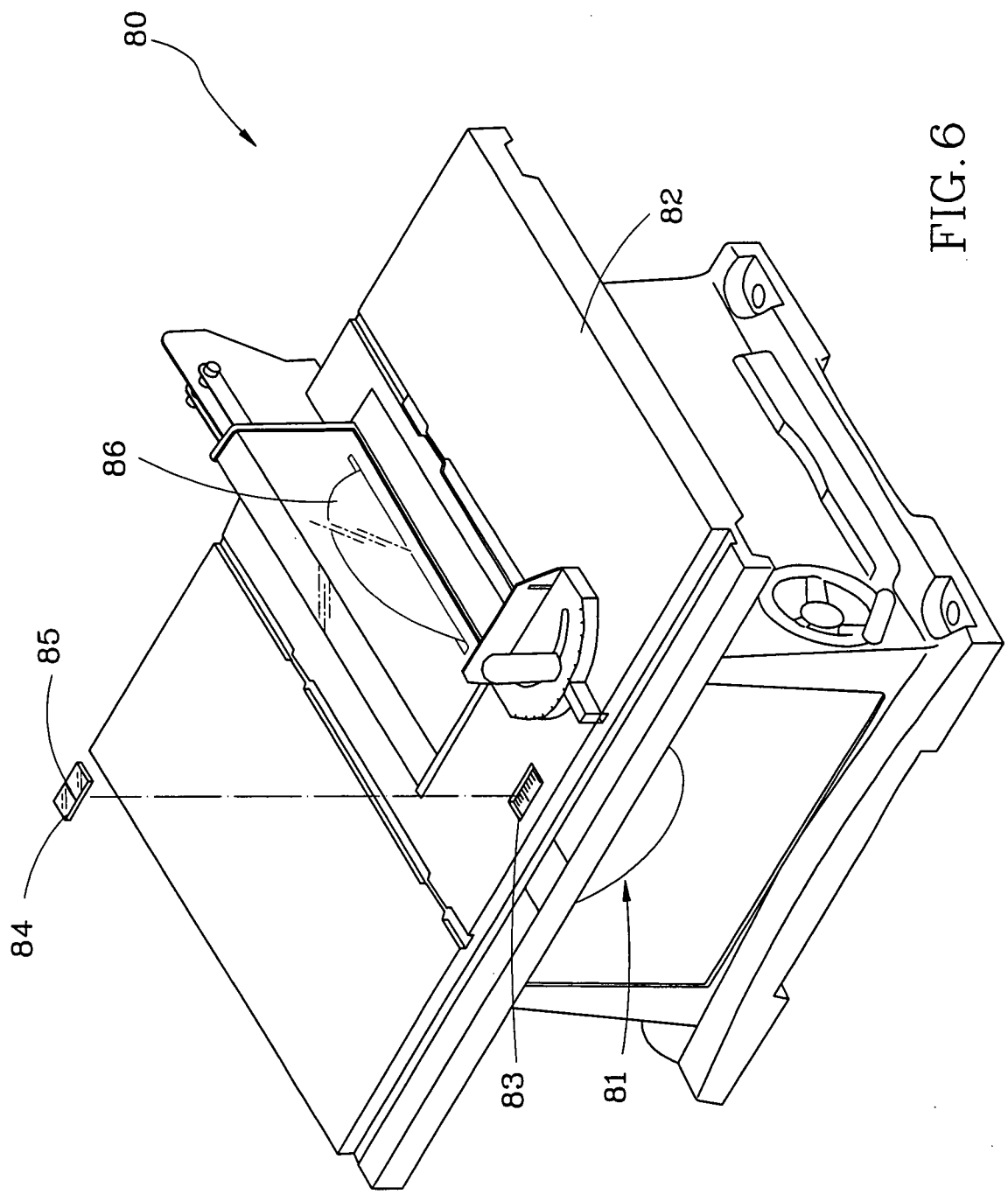
FIG. 6 is a schematic drawing showing the application of an angle indicator in a third embodiment of the present invention.
Figure 7:
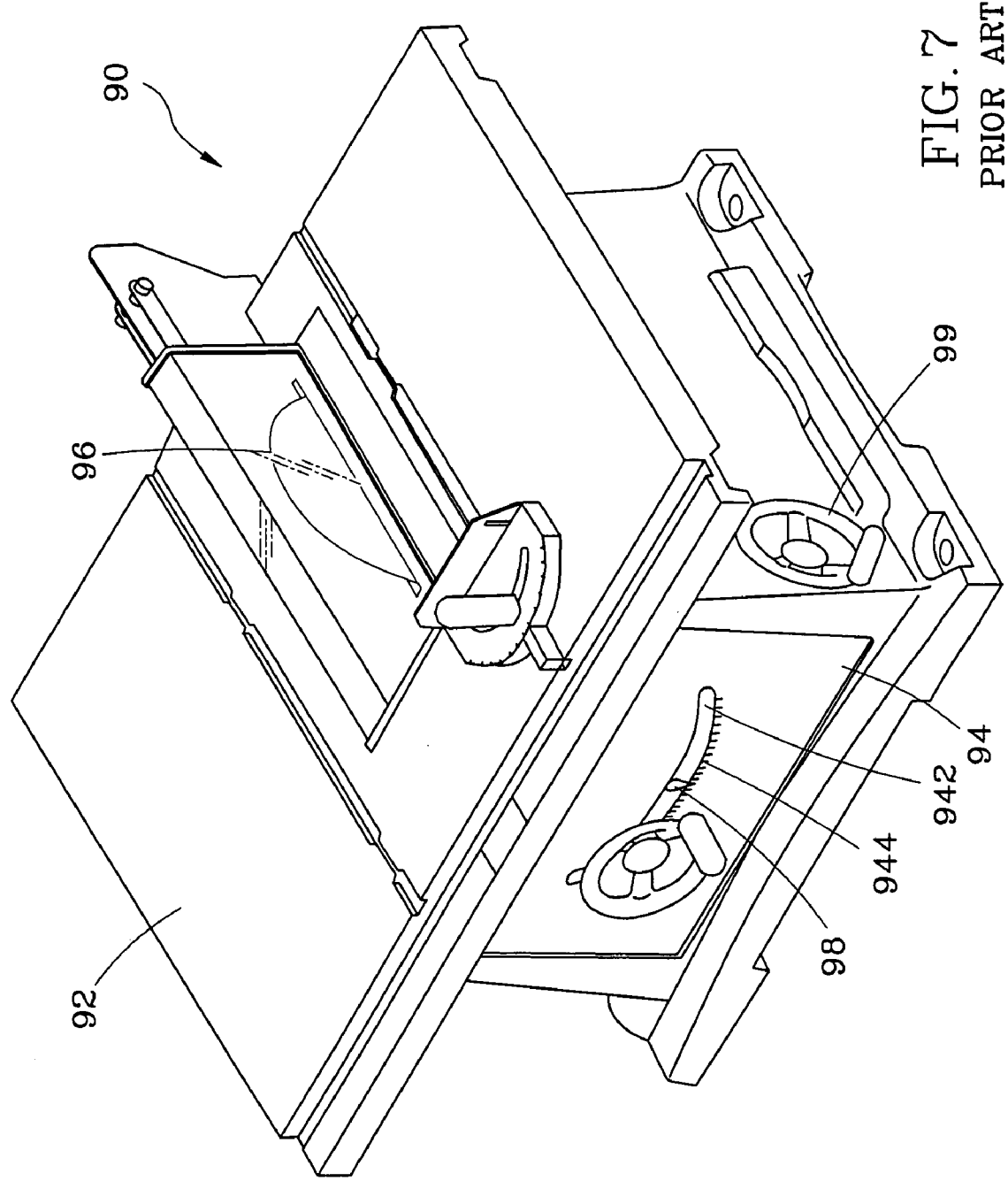
FIG. 7 is a perspective view of a table saw in the prior art.

FIG. 6 shows an angle indicator 81 provided in a sawing machine 80 in a third embodiment of the present invention. This third embodiment is substantially similar to the aforesaid first embodiment with the exception that the worktable 82 has a transparent cover 84 disposed in the through hole 83, and a pointer 85 marked on the transparent cover 84 for pointing out one of the aforesaid graduations in the index zone 44 of the elastic belt 40.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A sawing machine having an angle indicator comprising:
   a worktable,
   a pivot shaft,
   a saw blade holder fastened to said pivot shaft as the pivoting center thereof, pivoted relatively to said worktable so as to synchronously rotate said pivot shaft and having a motor,
   a saw blade connected to said saw blade holder, rotatable by said motor and passing through said worktable, and
   an angle indicator, said angle indicator comprising:
   an angle indicating member having an index zone, a belt on which said index zone is marked, and a guiding member over which said belt runs and by which said belt is tensed, said guiding member comprising two rollers located apart beyond each of two opposite sides of said pivot shaft and two locating members on which said rollers respectively are slipped;
   a following member fixed on said pivot shaft and connected to said angle indicating member; and
   a cover covering said angle indicating member and provided with an arched face, wherein the radius of said arched face corresponds to the pivoting radius of said following member,
   wherein at least one of said locating members has a body portion on which said roller is slipped, and a rear-end portion connecting with the body portion and provided with a thread,
   wherein said saw blade is moved with said saw blade holder, and said following member is pivoted with said saw blade holder by said pivot shaft to result in movement of said index zone of said angle indicating member when said saw blade holder pivots, so that the displacement of said index zone of said angle indicating member corresponds to the movement of said saw blade.

2. A sawing machine as claimed in claim 1, wherein the included angle between a lateral side of said saw blade and said worktable is changed when said saw blade holder pivots.

3. A sawing machine as claimed in claim 1, wherein said belt is an elastic member.

4. A sawing machine as claimed in claim 1, wherein said belt has a plane facing and paralleling said worktable.

5. A sawing machine as claimed in claim 1, wherein said worktable has a through hole through which said index zone of said angle indicating member is visually accessible.

6. A sawing machine as claimed in claim 5, wherein said index zone of said angle indicating member has graduations, and said worktable has a pointer disposed in or near said through hole for pointing out one of said graduations of said index zone.

7. A sawing machine as claimed in claim 1, wherein said sawing machine is a table saw.

8. A sawing machine as claimed in claim 1, wherein said locating members are screwed into said cover.

9. A sawing machine as claimed in claim 1, wherein said following member fixedly connecting with said angle indicating member and has an arched face.

\* \* \* \* \*